United States Patent [19]

Glew et al.

[11] Patent Number: 5,694,589
[45] Date of Patent: Dec. 2, 1997

[54] INSTRUCTION BREAKPOINT DETECTION APPARATUS FOR USE IN AN OUT-OF-ORDER MICROPROCESSOR

[75] Inventors: Andrew F. Glew, Hillsboro; Ashwani Kumar Gupta, Beaverton, both of Oreg.

[73] Assignee: Intel Corporation, Santa Clara, Calif.

[21] Appl. No.: 490,068

[22] Filed: Jun. 13, 1995

[51] Int. Cl.[6] .................................................. G06F 9/44
[52] U.S. Cl. ................................. 395/568; 395/183.06
[58] Field of Search ..................... 395/568, 800, 395/733, 183.01, 183.06, 183.13, 591

[56] References Cited

U.S. PATENT DOCUMENTS

| | | | |
|---|---|---|---|
| 5,165,027 | 11/1992 | Krauskopf | 395/416 |
| 5,404,473 | 4/1995 | Papworth et al. | 395/588 |
| 5,442,757 | 8/1995 | McFarland et al. | 395/394 |
| 5,479,616 | 12/1995 | Garibay, Jr. et al. | 395/388 |
| 5,479,652 | 12/1995 | Dreyer et al. | 395/183.06 |
| 5,481,685 | 1/1996 | Nguyen et al. | 395/591 |
| 5,491,793 | 2/1996 | Somasundaram et al. | 395/183.21 |
| 5,530,804 | 6/1996 | Edgington et al. | 395/183.06 |
| 5,537,559 | 7/1996 | Kane et al. | 395/591 |

*Primary Examiner*—Krisna Lim
*Assistant Examiner*—Viet Vu
*Attorney, Agent, or Firm*—Blakely, Sokoloff, Taylor & Zafman

[57] ABSTRACT

Code breakpoint detection logic for a superscalar microprocessor. Superscalar operation in a microprocessor is maintained with a single breakpoint detection mechanism which performs breakpoint detection prior to instruction decoding. One bit for each byte in an instruction packet is provided as a result of a comparison of the aligned instruction fetch to the debug registers. After decoding, if the first byte of an instruction has an appended breakpoint true bit, then an event is signaled for breakpoint handling by the superscalar microprocessor.

29 Claims, 5 Drawing Sheets

INSTRUCTION BREAKPOINT DETECTION APPARATUS FOR USE IN AN OUT-OF-ORDER MICROPROCESSOR

RELATED APPLICATION

The present invention is related to U.S. Pat. No. 5,404,473 issued Apr. 4, 1995, and assigned to the assignee of the present invention. That application describes some aspects of a speculative, out-of-order executing microprocessor and is fully incorporated herein by reference.

BACKGROUND OF THE INVENTION

1. Field of the Invention

The present invention relates to the field of computer architecture. More particularly, the present invention relates to an instruction breakpoint detection apparatus for debugging programs using a microprocessor.

2. Art Background

Numerous techniques are used to analyze the performance of computer programs, particularly during their development. This is often referred to as "debugging". The debugging process is recognized as a significant part of the development of a computer program. In some cases, the time required for debugging exceeds the time required to write the program.

One technique used for debugging computer programs is to interrupt the program at predetermined events and then examine, for instance, the contents of particular registers. One such event is the generation of predetermined addresses which may be references to the computer program or data. When the address generated by the computer matches one of the predetermined addresses, a "breakpoint" occurs. The operation of the computer is interrupted to permit analysis.

One method of providing a breakpoint interrupt is to modify the computer program itself. At certain addresses in the program, the program provides an interrupt. This method has the disadvantage that it is cumbersome and can be time consuming. Further, this method is inapplicable in the situation where the program is in a Read Only Memory (ROM).

In another method, hardware is used for breakpoint interrupts. This hardware compares the computer generated addresses with predetermined or user provided addresses and provides a breakpoint, or interrupt signal. Once such hardware mechanism for detecting breakpoints is described for the Intel Microprocessor Architecture which provides four debug registers, DR0–DR3, which can be set to be data breakpoints, code breakpoints, or I/O breakpoints according to the setting of various fields in a debug control register DR7. The Pentium™ Processor User's Manual, Volume 3, Chapter 17, describes the Intel Microprocessor Architecture use of the debug registers and debug control registers. Typically, the comparison of the address stored in the debug control register is made after an instruction has been fetched and decoded.

A complication arises in evaluating code breakpoints when microprocessors are designed to be superscalar in operation. In a superscalar microprocessor, numerous instructions may be decoded in the same clock cycle. Each of the instructions being decoded can be said to be processed through parallel pipelines. In order to handle instruction breakpoint detection, in a superscalar processor, traditionally, one of two mechanism is required to be implemented: first, duplicate hardware can be used for each pipe stage for detecting whether or not a decoded instruction corresponds to the instruction breakpoint address stored in one of the debug address registers. The disadvantage of this is obvious: duplication of hardware and excessive use of area on the microprocessor chip. An alternative, and one utilized by the Intel Pentium™ microprocessor, is to provide only a single set of debug detection circuitry and disable all but one of the decoding pipes when operating in a debug mode. Clearly, the disadvantage of this approach is the loss of the advantages of superscalar operation when attempting to debug a program with the microprocessor.

It would be desirable, and is therefore an object of the present invention, to provide a breakpoint detection mechanism which preserves the ability for a superscalar microprocessor to execute in a superscalar mode during debugging without the need for redundant detection circuitries.

SUMMARY OF THE INVENTION

From the foregoing, it can be appreciated that it would be desirable to provide a mechanism for instruction breakpoint detection in a superscalar microprocessor which allows the microprocessor to operate in a superscalar mode during debugging without requiring redundant breakpoint detection circuitries. Accordingly, the present invention provides a mechanism for use in the "front-end" of a superscalar microprocessor for breakpoint detection during superscalar operation of the microprocessor. Another object of the present invention is to minimize the number of bits appended to a fetched instruction stream for detection and isolation of instruction breakpoints for identifying which breakpoint register contains the address which matched the breakpoint.

These and other objects of the present invention are provided by a breakpoint comparison logic implemented in the front end of a superscalar microprocessor's instruction fetch mechanism. In an illustrated embodiment of the present invention, the upper 28-bits of each enabled debug register are compared to the linear address of a 16-byte instruction packet currently being processed in the front end. If a match is found, then a lower 4-bits of the address stored in the debug register are expanded by a 4:16 decoder. All of the decoded data is OR'ed with one bit being added to each byte of the 16 byte instruction stream. After the instruction is decoded, if it turns out that a first byte of an instruction has a breakpoint bit set, then an event is signaled that an instruction breakpoint has been reached. Appended bits not occurring on the first byte of an instruction are ignored. Further, only one bit is added to each byte rather than 1 bit for each debug register per byte to minimize the amount of area required in the processor for instruction breakpoint processing.

Once an event has been signaled by the front end section of the microprocessor that an instruction breakpoint has been encountered, it can be left to software or microcode to determine which debug register matched the aligned instruction byte causing the event to occur. By implementing the breakpoint detection logic prior to instruction decoding, only a single breakpoint detection circuitry is needed, even during superscalar operation. The 1 bit per byte indicating whether or not a code breakpoint has been met will then be checked by each of the instruction decoder circuitries in the superscalar processor simultaneously, thus allowing superscalar operation with only a single breakpoint detection logic.

BRIEF DESCRIPTION OF THE DRAWINGS

The objects, features and advantages of the present invention will be made apparent in the following detailed description in which.

DETAILED DESCRIPTION OF THE INVENTION

The present invention provides a method and apparatus for instruction breakpoint detection in a superscalar microprocessor. In the following detailed description, numerous specific details are set forth such as particular instruction sets and specified register designations in order to provide a thorough understanding of the present invention. It will be appreciated, however, by one skilled in the art that the present invention instruction breakpoint detection mechanism may be practiced in numerous different microprocessors where it is desirable to utilize a single breakpoint detection mechanism despite having superscalar operation of instruction decode. In other instances, well-known control structures and gate level circuits have not been shown in detail in order not to obscure important aspects of the present invention.

Figure 1:
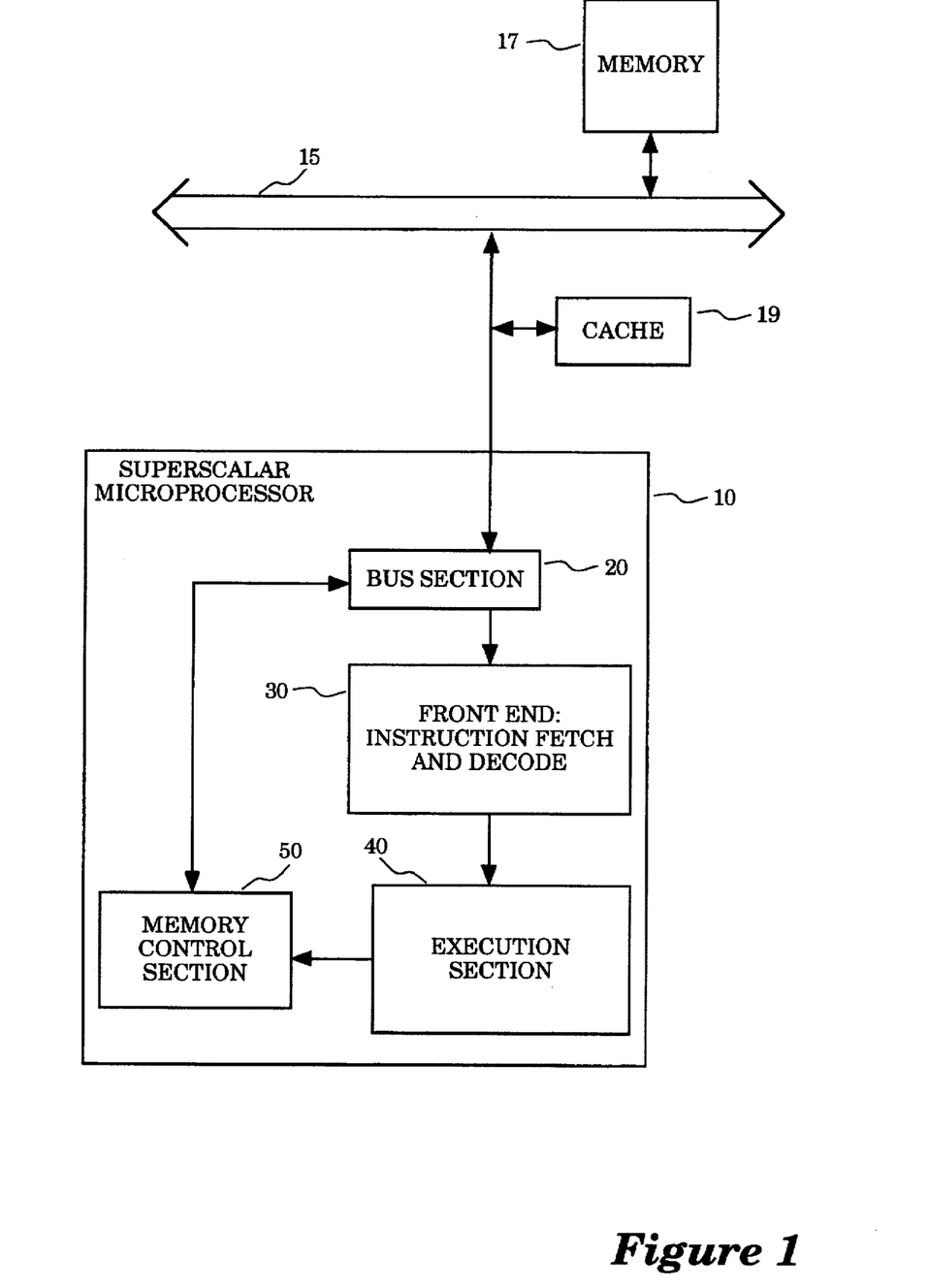
FIG. 1 illustrates a general computer architecture having a superscalar microprocessor which may incorporate the instruction breakpoint apparatus of the present invention.

Referring now to FIG. 1, a computer system architecture which includes a superscalar microprocessor 10 which may incorporate the present invention as illustrated. The superscalar microprocessor 10 is coupled to an external bus 15 for communication with an external memory system 17. The illustrated computer architecture also includes a cache 19 in communication with the superscalar microprocessor 10.

Although the computer system architecture of FIG. 1 is illustrated incorporating a superscalar microprocessor 10, it should be understood that the present invention may be implemented in a microprocessor which is not superscalar in operation. However, as will be described below, many of the advantages of the present invention are realized in a superscalar implementation because the present invention allows for instruction breakpoint detection to be carried out without limiting the superscalar operation of the microprocessor 10. Thus, the following discussion will assume a superscalar microprocessor implementation.

The superscalar microprocessor 10 illustrated in FIG. 1 is shown with block level functional sections separately identified. A bus section 20 is provided for allowing communications between the superscalar microprocessor 10 and the rest of the computer system such as to the cache 19, the memory system 17 and to other components of the computer system such as input/output devices (not shown). The functional portion of the superscalar microprocessor 10 is shown bifurcated into a front end section 30 and an execution section 40. The processor includes a memory control section 50 in communication with the execution section 40 and the bus section 20 for allowing the superscalar microprocessor 10 to interact with the computer system's memory system 17.

In one embodiment of the present invention, the superscalar microprocessor 10 is capable of performing speculative and out-of-order execution of instructions. Thus, the front end section 30 of the superscalar microprocessor 10 may be considered to be the in-order section of the processor for fetching the in-order macro-instruction sequence to be run by the microprocessor and converting it to a sequence of micro-operations to be dispatched to the execution section 40. The execution section 40 in one embodiment processes the received instructions stream from the front end in an out-of-order fashion, executing queued instructions for which all dependencies are resolved, regardless of original program order to later be retired in original program order.

In accordance with the superscalar nature of microprocessor 10, the front end section 30 dispatches a plurality of instructions every clock cycle to the execution section 40. Further, the front end section 30 in the one embodiment is responsible for the speculative nature of the processor and hence may include such things as a branch target buffer for tabling predicted branches to be taken. The front end section 30, about which more will be described further herein, will include an instruction cache for retrieving macro-instructions to be decoded, and hence will also include a number of decoding circuits for decoding instructions for superscalar dispatch in parallel. The front end section 30 may also include such things as a micro-sequencing unit and other instruction insertion units. U.S. Pat. No. 5,404,473 which has been incorporated herein by reference describes in more detail the operation of a speculative executing out-of-order microprocessor.

The present invention concerns providing and detecting instruction breakpoints for debugging programs executed by the superscalar microprocessor 10. In one embodiment of the present invention, the superscalar microprocessor 10 is compatible with the Intel Microprocessor Architecture design and provides a plurality of debug registers known as registers DR0–DR7. A description of the debug registers can be found in Chapter 17 of the Pentium™ Processor User's Manual referred to above. In this architecture, the four register DR0–DR3 are each used for holding the linear address for one of four breakpoints. The DR7 register is a control register which defines whether or not the addresses in registers DR0–DR3 are for instruction breakpoints, or other types of breakpoints. The DR7 register also indicates whether or not each of the debug address registers is enabled. For purposes of the present invention, it will be assumed that the addresses stored in the debug registers DR0–DR3, if enabled, are instruction code breakpoint addresses, and that the appropriate values are set in the debug control register DR7 for indicating which of the registers contain code breakpoint addresses.

Figure 2:
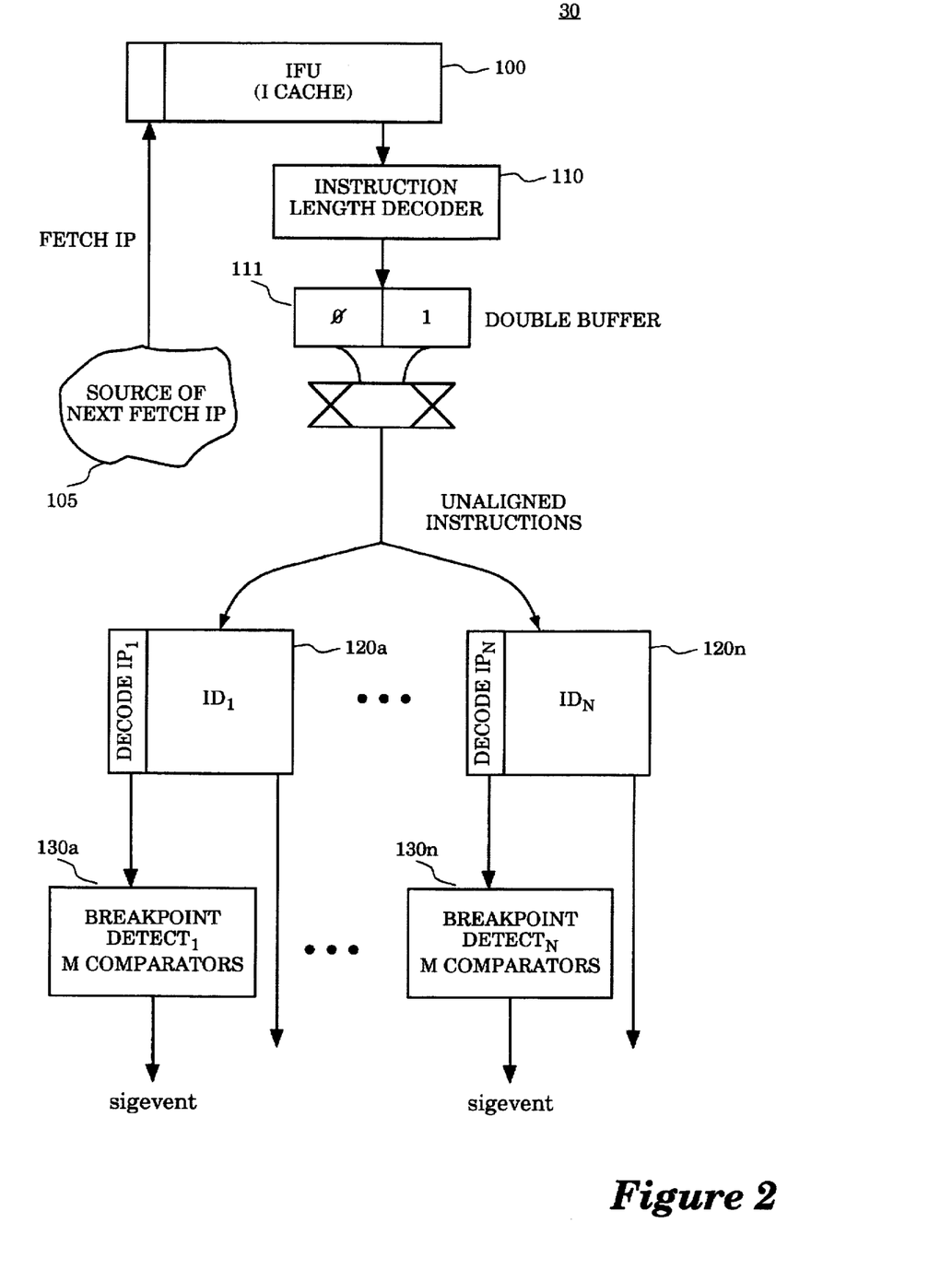
FIG. 2 illustrates a portion of a superscalar microprocessor which suffers the disadvantages of having redundant breakpoint detection mechanisms.

Referring now to FIG. 2, there is illustrated one embodiment of the front end section 30 for a superscalar microprocessor which, as will be described, suffers some of the disadvantages noted in the previous section. Many of the elements illustrated in FIG. 2 will be described in more detail with respect to FIG. 3. It can be seen from FIG. 2 that once the instruction Fetch and I Cache unit 100 has provided a packet of instruction data for decoding to the instruction decoding circuits 120a to 120n, it is possible to then determine if an instruction breakpoint has been encountered. As was described, instruction breakpoint addresses may be stored in the instruction breakpoint address registers of which there may be an arbitrary number. Thus, for each instruction being decoded by the instruction decode circuits 120a to 120n, a plurality of comparing circuits must be provided for comparing the decoded instruction pointer to each of the values stored in each of the breakpoint address registers.

Each instruction decode circuit 120a to 120n in FIG. 2 is associated with a breakpoint detect circuit 130a to 130n. Each of the breakpoint detect circuits 130a to 130n will include therein comparing circuitry for comparing the decode IP from its associated instruction decoding circuit to the addresses in each of the breakpoint address registers. Thus, it can be seen that to provide breakpoint detection circuitry while maintaining superscalar operation of the microprocessor it is necessary to provide as many breakpoint detection circuits 130a to 130n as there are instruction decode circuits. Further, each of those breakpoint detect circuits will include a number of comparing circuits equal to the number of breakpoint address registers provide in the system. Thus, N×M comparing circuits are needed to provided superscalar operation simultaneously with breakpoint detection capability for debugging.

As noted above, an alternative to the mechanism of FIG. 2 is to disable the superscalar nature of instruction dispatching in the microprocessor during debugging. In that case, only one set of breakpoint detect circuits is needed having the one set of M comparators for comparing to the M possible addresses stored in a breakpoint address registers. The disadvantage of this, of course, is that the performance of the superscalar microprocessor is lost during debugging which could potentially produce sporadic results.

The following figures disclose the method and apparatus of the present invention which allows for debugging with a superscalar microprocessor requiring only one set of comparing circuits for breakpoint detection while maintaining superscalar operation of the processor.

Figure 3:
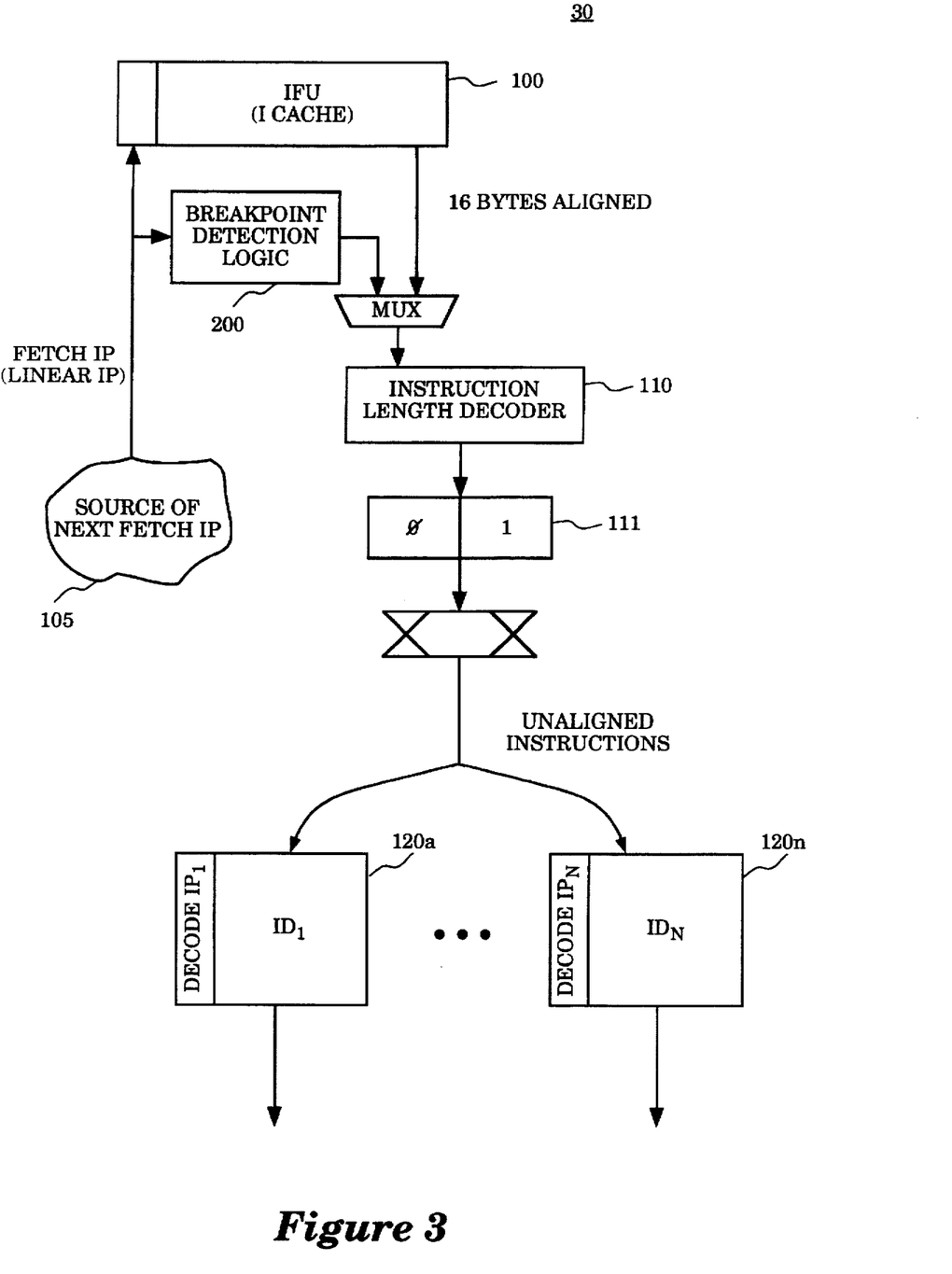
FIG. 3 shows a more detailed view of the front end of a superscalar microprocessor incorporating the instruction breakpoint mechanism of the present invention.

FIG. 3 illustrates a portion of the front end section of the superscalar microprocessor 10 in an embodiment similar to that shown in FIG. 2. However, it is noted that in FIG. 3 the repeated breakpoint detect circuitries 130a to 130n of FIG. 2 are omitted. In accordance with the present invention, breakpoint detection is not performed following instruction decoding as illustrated in the embodiment of FIG. 2. Instead, breakpoint detection is moved within the front end section to precede instruction decoding by marking aligned bytes as appropriate after they are fetched.

The Instruction Fetch Unit 100 of FIG. 3 is illustrated to indicate that it also includes the instruction cache (I Cache) of the microprocessor for illustrative purposes in this embodiment. The Instruction Fetch Unit 100 and the breakpoint detection circuitry 200 to be described further herein each operate on a received linear address. This is contrasted with actual physical memory addresses and is defined for the illustrated embodiment in accordance with the Intel Microprocessor Architecture. The IFU 100 receives a linear instruction pointer from an area illustrated as Source of Next Fetch IP 105. The instruction fetch unit may receive its next linear instruction pointer from various sources in the complex superscalar microprocessor. In accordance with one embodiment of the present invention, the instruction fetch unit retrieves 16 aligned bytes of instruction information at each pass. During serial operation, the source of next fetch IP will usually be the previous fetched IP pointer incremented to identify the next 16 bytes to be retrieved. The source of the next fetch IP may also be the result of branch prediction circuitry or other mechanisms which indicate that other than serial flow of instruction pointers are to be fetched.

In any event, a next fetch instruction pointer (fetch IP) is provided to the IFU 100 which retrieves 16 aligned bytes of instruction data at that address to be processed by the microprocessor's front end. The 16 aligned bytes are then provided to an instruction length decoder 110. The need for an instruction length decoder arises from the conjunction of two facts: the illustrated embodiment is intended to be compatible with the Intel Microprocessor Architecture, and because of that it must be able to contend with variable length instructions common to a complex instruction set computing (CISC) instruction set. The instruction length decoder examines the fetched 16 instruction bytes and determines where in those 16 bytes one instruction ends and another begins. The output of the instruction length decoder 110 is encoded into length marks. In accordance with one embodiment of the present invention, the instruction length decoder length marks consist of 2 bits per instruction byte: one bit indicates whether that byte is the first op code byte of an instruction (which may not be the first byte of an instruction because of prefix bytes) while the other bit indicates whether a byte is the last byte of an instruction. The instruction bytes are then passed through instruction buffer stage 111 where the instructions are then split according to the first and last byte indicators and provided to the instruction decoding circuitries 120a and 120n. The results of the instruction decoding are then dispatched to the execution section 40 of the superscalar microprocessor 10.

The breakpoint detection logic 200 of the present invention, as noted above, is provided at the "top" of the front end section of the microprocessor where it operates in accordance with the same linear instruction pointer being provided to the instruction fetch unit 100. The breakpoint detection logic 200 will determine if the next fetch IP corresponds to one of the breakpoint addresses stored in the debug address registers of the microprocessor.

The breakpoint detection logic 200 appends 1 bit to each byte of aligned instruction data retrieved by the IFU 100. If the breakpoint detection logic 200 detects a match with one of the stored breakpoint addresses, then a true "breakpoint value" bit is appended to the byte where the IP matched. Otherwise, a "false" or "low" value such as a "0" is appended to the byte. It should be noted that it is possible for a match to occur on a byte that is not the beginning address of an instruction. Should this happen, a breakpoint has not truly been detected. It is only if an instruction break-point address is equal to the beginning byte address of an instruction that a breakpoint event will be signaled. As will be described below, with respect to FIG. 5, it is the value of the breakpoint bit in an instruction's first byte which will determine whether or not the instruction decoder will actually output the decoded instruction, or whether it will signal a breakpoint event.

Figure 4:
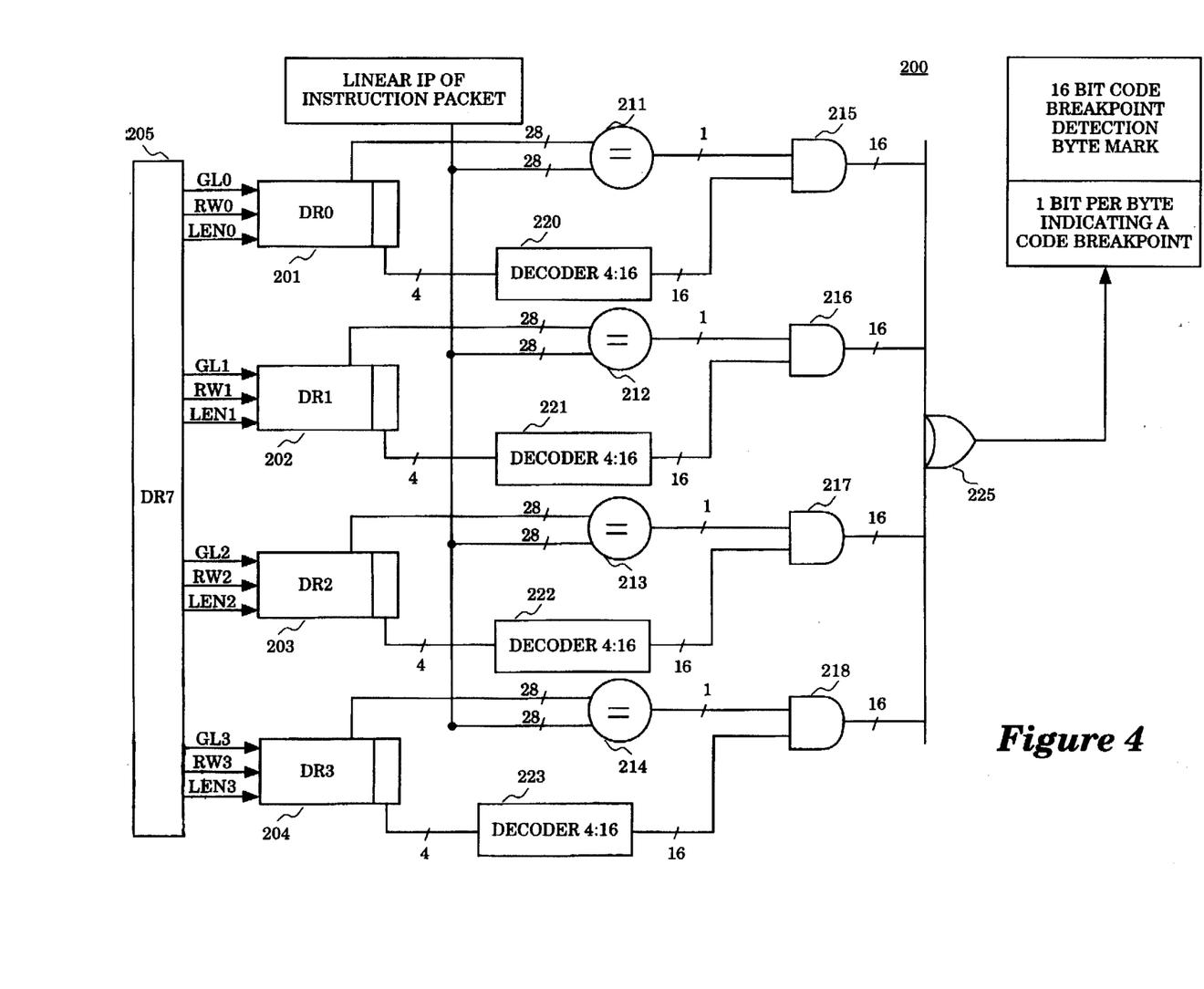
FIG. 4 illustrates the instruction breakpoint logic in accordance with one embodiment of the present invention.

Referring now to FIG. 4, the breakpoint detection logic 200 in accordance with one embodiment of the present invention is shown. This embodiment illustrates the breakpoint detection logic 200 in accordance with a superscalar microprocessor which is compatible with the Intel Microprocessor Architecture. The four debug registers DR0 to DR3 are illustrated as registers 201, 202, 203 and 204. Each is controlled by setting bits in the DR7 control register 205 which indicates whether or not the particular DR register is enabled for storing an instruction code breakpoint. For code breakpoints, the RW value associated with the address register should be set to 00 and the LEN value should be set to 00 in accordance with the Intel Microprocessor Architecture. Each of the four debug registers can be individually enabled by the appropriate setting of the fields in the DR7 register 205.

The breakpoint detection logic 200 receives the linear instruction pointer of the next fetch address to be fetched by the Instruction Fetch Unit 100. The upper 28 bits of each enabled debug register DR0 to DR3 are compared to the upper 28 bits of the linear address of the 16 byte instruction packet currently being fetched. This comparison is carried out by comparators 211, 212, 213 and 214, respectively. A positive output from the comparators 211 to 214 provides an enabling signal to the corresponding enable gates 215, 216, 217 and 218, respectively.

If a match is found in the upper 28 bits of the fetched linear IP with a stored address in one of the debug registers, then the lower 4 bits of the matching debug register value are passed through one of the corresponding 4:16 decoders 220, 221, 222 and 223, respectively. Note that it is possible to match more than one of the values stored in multiple debug registers. The 4:16 decoders translate the four lower bits of the corresponding debug register into a 16-bit code according to the following Table I:

instruction byte so that the particular debug register which resulted in a breakpoint hit is determined. However, this is less advantageous than the above described embodiment with respect to FIGS. 3, 4 and 5 which require only 1 bit for each instruction byte for breakpoint detection during debugging.

There has thus been described a method and apparatus for breakpoint detection in a superscalar microprocessor which allows for continued superscalar operation during debugging but without requiring redundant breakpoint comparing circuitries. Although the present invention has been described in terms of a particular and illustrated embodiment, it should be understood that the present invention may be used in other processors where it is desirable to simplify the breakpoint detection circuitry without sacrificing processor performance. Accordingly, the present invention should be judged in terms of the claims which follow.

TABLE I

| 4 Bit | | 4:16 Decoder |
|---|---|---|
| | | 1 of N Code |

| dec | Binary | bit 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| 0 | 0000 | 1 | 0 | 0 | 0 | 0 | 0 | 0 | 0 | 0 | 0 | 0 | 0 | 0 | 0 | 0 | 0 |
| 1 | 0001 | 0 | 1 | 0 | 0 | 0 | 0 | 0 | 0 | 0 | 0 | 0 | 0 | 0 | 0 | 0 | 0 |
| 2 | 0010 | 0 | 0 | 1 | 0 | 0 | 0 | 0 | 0 | 0 | 0 | 0 | 0 | 0 | 0 | 0 | 0 |
| 3 | 0011 | 0 | 0 | 0 | 1 | 0 | 0 | 0 | 0 | 0 | 0 | 0 | 0 | 0 | 0 | 0 | 0 |
| 4 | 0100 | 0 | 0 | 0 | 0 | 1 | 0 | 0 | 0 | 0 | 0 | 0 | 0 | 0 | 0 | 0 | 0 |
| 5 | 0101 | 0 | 0 | 0 | 0 | 0 | 1 | 0 | 0 | 0 | 0 | 0 | 0 | 0 | 0 | 0 | 0 |
| 6 | 0110 | 0 | 0 | 0 | 0 | 0 | 0 | 1 | 0 | 0 | 0 | 0 | 0 | 0 | 0 | 0 | 0 |
| 7 | 0111 | 0 | 0 | 0 | 0 | 0 | 0 | 0 | 1 | 0 | 0 | 0 | 0 | 0 | 0 | 0 | 0 |
| 8 | 1000 | 0 | 0 | 0 | 0 | 0 | 0 | 0 | 0 | 1 | 0 | 0 | 0 | 0 | 0 | 0 | 0 |
| 9 | 1001 | 0 | 0 | 0 | 0 | 0 | 0 | 0 | 0 | 0 | 1 | 0 | 0 | 0 | 0 | 0 | 0 |
| 10 | 1010 | 0 | 0 | 0 | 0 | 0 | 0 | 0 | 0 | 0 | 0 | 1 | 0 | 0 | 0 | 0 | 0 |
| 11 | 1011 | 0 | 0 | 0 | 0 | 0 | 0 | 0 | 0 | 0 | 0 | 0 | 1 | 0 | 0 | 0 | 0 |
| 12 | 1100 | 0 | 0 | 0 | 0 | 0 | 0 | 0 | 0 | 0 | 0 | 0 | 0 | 1 | 0 | 0 | 0 |
| 13 | 1101 | 0 | 0 | 0 | 0 | 0 | 0 | 0 | 0 | 0 | 0 | 0 | 0 | 0 | 1 | 0 | 0 |
| 14 | 1110 | 0 | 0 | 0 | 0 | 0 | 0 | 0 | 0 | 0 | 0 | 0 | 0 | 0 | 0 | 1 | 0 |
| 15 | 1111 | 0 | 0 | 0 | 0 | 0 | 0 | 0 | 0 | 0 | 0 | 0 | 0 | 0 | 0 | 0 | 1 |

The output of the decoder corresponding to a matching debug register is then used to append a bit to each byte of the 16 byte instruction packet via the OR logic 225. Thus, referring back to FIG. 3, the instruction packet together with the 16-bit code breakpoint detection byte marks are delivered to the instruction buffer 111 for delivery to the instruction decoding circuitry. Again, note that there is no guarantee that the breakpoint address does indeed coincide with the beginning byte of an instruction; the code breakpoint logic described with respect to FIG. 4 only places a code breakpoint mark at the byte pointed to by the matching debug register.

Figure 5:
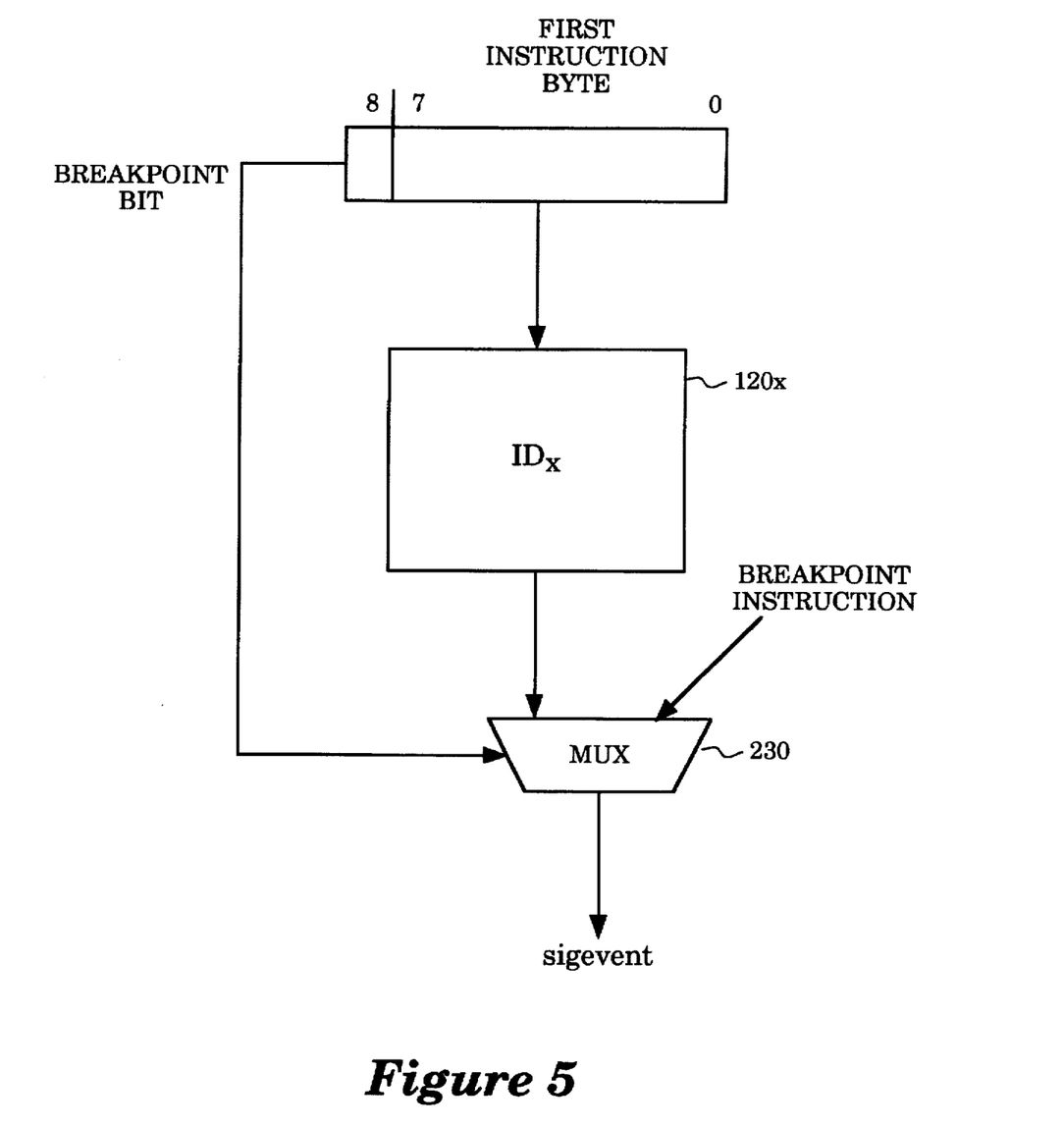
FIG. 5 illustrates logic for determining when an instruction breakpoint has been detected in a fetched instruction.

FIG. 5 illustrates that when an instruction is provided to the instruction decoder circuitry, only the first instruction byte is looked at for breakpoint determination. If the first instruction byte is marked with an indication that there is a breakpoint hit by the breakpoint detection logic 200, then that bit is used to control multiplexing logic 230. If the breakpoint bit is set, then instead of outputting the decoded instruction, the multiplexing logic will provide a SIG event or breakpoint instruction to the microprocessor execution section. This will signal the microprocessor that a breakpoint address stored in a debug register has matched the first instruction byte of an instruction being decoded and that the breakpoint should be handled. The microprocessor can then use software or microcode to go back and determine which debug register had the matching address.

In an alternative embodiment, rather than marking one bit per byte, it would be possible to use 4 bits for each

What is claimed is:

1. An instruction breakpoint detection apparatus comprising:

a memory element to store a linear breakpoint address;

an instruction fetch mechanism to retrieve a packet of aligned instruction data in accordance with a provided fetch instruction pointer, said packet of aligned instruction data including (N) bytes;

a comparing circuit coupled to said instruction fetch mechanism and in communication with said memory element, said comparing circuit to compare said fetch instruction pointer to said linear breakpoint address; and a byte marking circuit, coupled and responsive to said comparing circuit, to generate a breakpoint marking sequence including (N) bits, each of which is associated with a respective byte of said packet of aligned instruction data, and identifying at least one byte of said packet of aligned instruction data as a code breakpoint, said breakpoint marking sequence being generated responsive to a match between at least a portion of said fetch instruction pointer and at least a portion of said linear breakpoint address.

2. The instruction breakpoint detection apparatus of claim 1 wherein instruction addresses comprise (T) total bits comprising (U) upper bits and (L) lower bits, the comparing circuit comprising circuitry to compare the upper (U) bits of the fetch instruction pointer with the upper (U) bits of the stored linear breakpoint address.

3. The instruction breakpoint apparatus of claim 2 wherein said byte marking circuit comprises an L:N decoding circuit to convert the lower (L) bits of the stored breakpoint address to said breakpoint marking sequence for marking said packet of aligned instruction data with a breakpoint bit which identifies said at least one byte as said code breakpoint.

4. The instruction breakpoint detection apparatus of claim 3 wherein said (T) total bits of (U) upper bits and (L) lower bits comprises 32 bits with 28 upper bits and 4 lower bits, said packet of aligned instruction data comprises 16 bytes, and said L:N decoding circuit comprises a 4:16 decoder.

5. The instruction breakpoint detection apparatus of claim 3 further comprising:
   an additional plurality of (M) memory elements to store a plurality of linear breakpoint addresses; and
   an additional plurality of (M) byte marking circuits, each associated with one of said additional plurality of memory elements,
   wherein said comparing circuit includes circuitry to compare said fetch instruction pointer to each of said plurality of linear breakpoint addresses.

6. The instruction breakpoint detection apparatus of claim 3 further including an instruction decoding mechanism to receive fetch instruction data, said instruction decoding mechanism including:
   detection circuitry to determine if the first byte of an instruction is marked with a breakpoint bit; and
   signaling circuitry to signal a breakpoint condition.

7. The instruction breakpoint detection apparatus of claim 5 wherein said breakpoint marking sequence includes only 1 bit for each byte of said packet of aligned instruction data.

8. The instruction breakpoint detection apparatus of claim 5 wherein said breakpoint marking sequence includes M bits for each byte of said packet of aligned instruction data.

9. A microprocessor comprising:
   an instruction execution block to execute instructions;
   an instruction fetch and decode block coupled to communicate with said instruction execution block, said instruction fetch and decoding block to fetch and decode instruction data for providing said instructions to said instruction execution block; and
   an instruction break point detection apparatus incorporated within said instruction fetch and decode block, said instruction breakpoint detection apparatus comprising:
      a memory element to store a linear breakpoint address;
      an instruction fetch mechanism to retrieve a packet of aligned instruction data in accordance with a provided fetch instruction pointer, said packet of aligned instruction data including (N) bytes;
      a comparing circuit coupled to said instruction fetch mechanism and in communication with said memory element, said comparing circuitry to compare said fetch instruction pointer to said linear breakpoint address; and
      a byte marking circuit, coupled and responsive to said comparing circuit, to generate a breakpoint marking sequence including (N) bits, each of which is associated with a respective byte of said packet of aligned instruction data, and identifying at least one byte of said packet of aligned instruction data as a code breakpoint, said breakpoint marking sequence being generated responsive to a match between at least a portion of said fetch instruction and at least a portion of said linear breakpoint address.

10. The microprocessor of claim 9 wherein instruction addresses comprise (T) total bits comprising (U) upper bits and (L) lower bits, the comparing circuit comprising circuitry to compare the upper (U) bits of the fetch instruction pointer with the upper (U) bits of the stored linear breakpoint address.

11. The microprocessor of claim 10 wherein said byte marking circuit comprises an L:N decoding circuit to convert the lower (L) bits of the stored breakpoint address to said breakpoint marking sequence for marking said packet of aligned instruction data with a breakpoint bit which identifies said at least one byte as said code breakpoint.

12. The microprocessor of claim 11 wherein said (T) total bits of (U) upper bits and (L) lower bits comprises 32 bits with 28 upper bits and 4 lower bits, said packet of aligned instruction data comprises 16 bytes, and said L:N decoding circuit comprises a 4:16 decoder.

13. The microprocessor of claim 11 further comprising:
   an additional plurality of (M) memory elements to store a plurality of linear breakpoint addresses; and
   an additional plurality of (M) byte marking circuits, each associated with one of said additional plurality of memory elements,
   wherein said comparing circuit includes circuitry to compare said fetch instruction pointer to each of said plurality of linear breakpoint addresses.

14. The microprocessor of claim 11 further including an instruction decoding mechanism to receive fetch instruction data, said instruction decoding mechanism including:
   detection circuitry to determine if the first byte of an instruction is marked with a breakpoint bit; and
   signaling circuitry to signal a breakpoint condition.

15. The microprocessor of claim 13 wherein said breakpoint marking sequence includes only 1 bit for each byte of said packet of aligned instruction data.

16. The microprocessor of claim 13 wherein said breakpoint marking sequence includes M bits for each byte of said packet of aligned instruction data.

17. A computer system comprising:
   a bus;
   a main memory, coupled to said bus to store digital data; and a microprocessor, coupled to said bus, to process said digital data, said microprocessor comprising:
      an instruction fetch and decode block coupled to communicate with an execution block, said instruction fetch and decode block to fetch and decode instruction data for providing said instructions to said instruction execution block; and
      an instruction break point detection apparatus incorporated within said instruction fetch and decode block, said instruction breakpoint detection apparatus comprising:
         a memory element to store a linear breakpoint address;
         an instruction fetch mechanism to retrieve a packet of aligned instruction data in accordance with a provided fetch instruction pointer, said packet of aligned instruction data including (N) bytes;
         a comparing circuit coupled to said instruction fetch mechanism and in communication with said memory element, said comparing circuit to compare said fetch instruction pointer to said linear breakpoint address; and
         a byte marking circuit, coupled and responsive to said comparing circuit, to generate a breakpoint marking sequence including (N) bits, each of which is associated with a respective byte of said packet of aligned instruction data, and identifying at least one byte of said packet of aligned instruction data as a code breakpoint, said breakpoint marking sequence being generated responsive to a match between at least a portion of said fetch instruction and at least a portion of said linear breakpoint address.

18. The computer system of claim 17 wherein instruction addresses comprise (T) total bits comprising (U) upper bits and (L) lower bits, the comparing circuit comprising circuitry to compare the upper (U) bits of the fetch instruction pointer with the upper (U) bits of the stored linear breakpoint address.

19. The computer system of claim 18 wherein said byte marking circuit comprises an L:N decoding circuit to convert the lower (L) bits of the stored breakpoint address to said breakpoint marking sequence for marking said packet of aligned instruction data with a breakpoint bit which identifies said at least one byte as said code breakpoint.

20. The computer system of claim 19 wherein said (T) total bits of (U) upper bits and (L) lower bits comprises 32 bits with 28 upper bits and 4 lower bits, said packet of aligned instruction data comprises 16 bytes, and said L:N decoding circuit comprises a 4:16 decoder.

21. The computer system of claim 19 further comprising:
an additional plurality of (M) memory elements to store a plurality of linear breakpoint addresses; and
an additional plurality of (M) byte marking circuits, each associated with one of said additional plurality of memory elements,
wherein said comparing circuit includes circuitry to compare said fetch instruction pointer to each of said plurality of linear breakpoint addresses.

22. The computer system of claim 19 further including an instruction decoding mechanism for receiving fetch instruction data, said instruction decoding mechanism including:
detection circuitry to determine if the first byte of an instruction is marked with a breakpoint bit; and
signaling circuitry to signal a breakpoint condition.

23. The computer system of claim 21 wherein said breakpoint marking sequence includes only 1 bit for each byte of said packet of aligned instruction data.

24. The computer system of claim 21 wherein said breakpoint marking sequence includes M bits for each byte of said packet of aligned instruction data.

25. A method of detecting instruction code breakpoints comprising the steps of:
storing a breakpoint address in a memory element;
fetching an aligned packet of (N) bytes of instruction data based on a fetch instruction pointer;
comparing the fetch instruction pointer to the breakpoint address;
generating a breakpoint marking sequence including (N) bits, each of which is associated with a respective byte of said aligned packet, and identifying at least one byte of said (N) bytes of said aligned packet as a code breakpoint, if said comparing step produces a match between at least a portion of said fetch instruction pointer and at least a portion of said breakpoint address.

26. The method of claim 25 further comprising the step of signaling a breakpoint event if a first byte of an instruction is identified as the code breakpoint.

27. The method of claim 26 wherein said comparing step comprises the step of comparing said fetch instruction pointer with multiple stored breakpoint addresses.

28. The method of claim 26 wherein after said signaling step, said method comprises the step of determining which stored breakpoint address matched said fetch instruction pointer.

29. The method of claim 28 wherein sad comparing step comprises the step of comparing the upper bits of said breakpoint address with the upper bits of said fetch instruction pointer and said generating step comprises the steps of decoding the lower bits of said breakpoint address and appending said breakpoint marking sequence to said aligned packet.

* * * * *